Patented Dec. 9, 1952

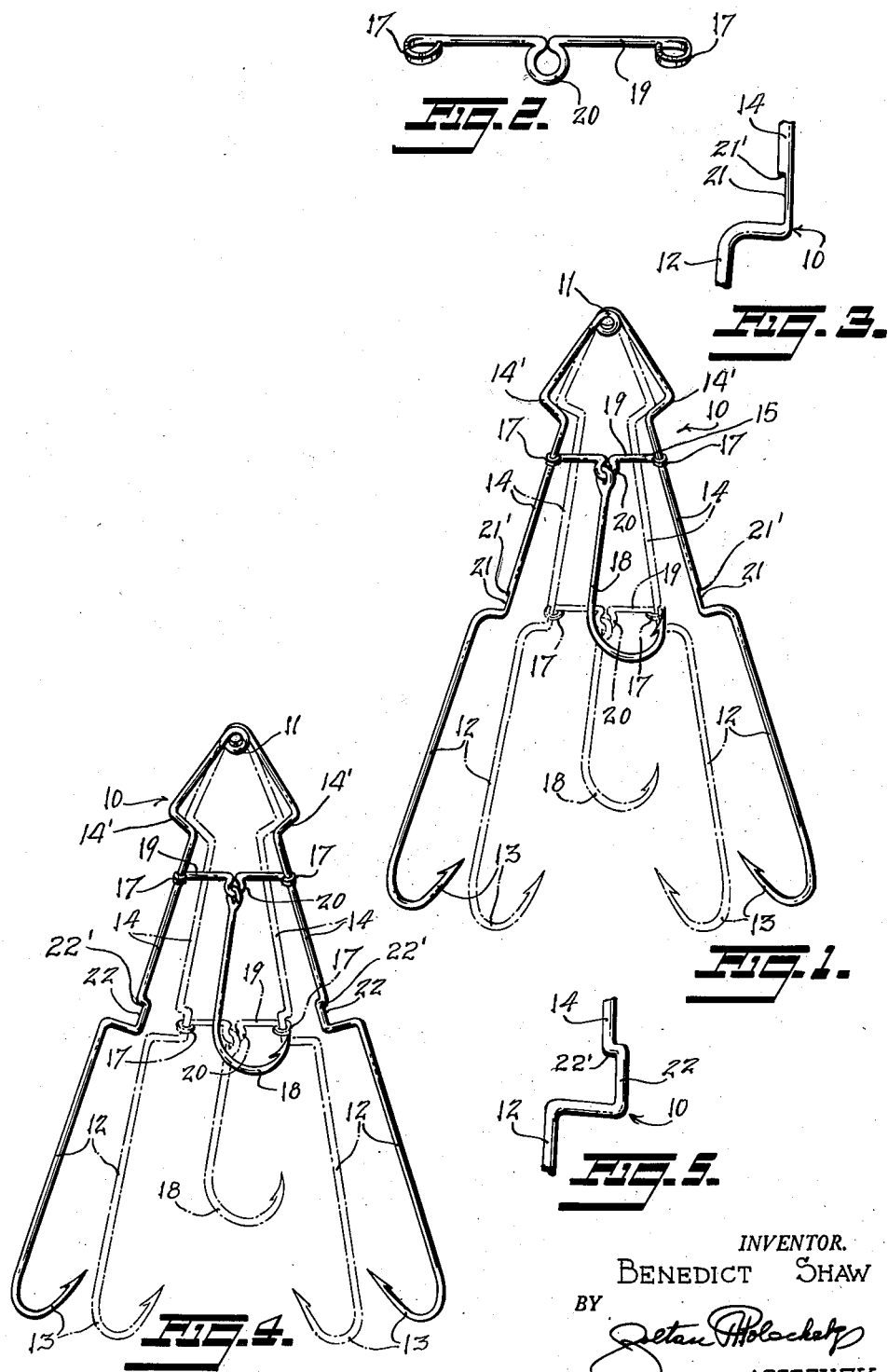

2,620,590

UNITED STATES PATENT OFFICE 2,620,590

COMBINED FISHING HOOK AND GRIP

Benedict Shaw, Bronx, N. Y.

Application December 15, 1949, Serial No. 133,145

4 Claims. (Cl. 43—89)

1

This invention relates to a fish hook and pertains particularly to a device wherein gaffing means are operated when a fish is caught on a bait-hook.

One object of the present invention is to provide a fish hook which includes gaffing means normally biased apart to ineffective positions and means including a bait-hook which are operative when said bait-hook is taken by a fish for effectively drawing said gaffing means together, to thereby assure the catch of said fish.

Another object of the present invention is to provide means adapted to gaff a fish when said fish is caught on a conventional bait-hook, and means whereby said gaffing means is maintained effective until released manually.

Still another object of the present invention is to provide a device including fish gaffing means operative upon the catching of a fish on a bait-hook, which is of simple readily manufactured one-piece spring wire construction.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Fig. 1 is a front view illustrating the present device with the arms in extended ineffective position in solid lines and with the arms drawn together in effective position in dot and dash lines.

Fig. 2 is a front view of the slidable cross member of the device in Fig. 1.

Fig. 3 is a fragmentary view illustrating locking means provided in the arms of the embodiment shown in Fig. 1.

Fig. 4 is a front view showing a modification of the embodiment of Fig. 1 with the arms thereof seen in both extended and drawn together positions, and Fig. 5 is a fragmentary view illustrating the form of locking means employed in the modification seen in Fig. 4.

The fish hook, according to the first form of the present invention shown in Fig. 1, includes a one-piece construction 10 which may be formed from any suitable spring wire. Said one-piece construction is configured to provide a loop 11 at the central upper portion thereof, and a pair of downwardly and outwardly extending arms 12. At the lower ends of said arms 12, are provided inwardly extending gaffs 13. Intermediate the loop 11 and the gaffs 13, the said arms 12 are

2 shaped to provide elongated inwardly extending stepped portions 14 provided with risers 14'. Adapted to associate slidably with said stepped portions is a cross member 15 which is also preferably of a one-piece wire construction. Said cross member 15 is formed to provide a central loop 20 and end loops 17. The central loop 16 is adapted to have secured thereto, a conventional fish bait-hook 18 and the mentioned end loops 17 are adapted to embrace slidably the inwardly extending stepped portions 14.

Normally, in consequence of the inherent resilience of the spring wire and the loop 11, the arms 12 and, therefore, the gaffs 13 are extendedly and ineffectively positioned. This also positions the slidable cross member 15 adjacent the upper ends of the mentioned stepped portions 14.

Now, when in use and the bait-hook 18 is taken by a fish and pulled toward the ends of the arms 12, the cross member 15 is effectively drawn downwardly on the stepped portions 14 and the resultant camming action between the end loops 17 and said stepped portions causes said arms 12 and gaffs 13 to be drawn together, as shown in dot and dash in Fig. 1. Thusly the gaffs 13 are positioned effectively to gaff the fish and thereby assure the catch thereof.

Also, the present embodiment is provided with further stepped portions formed by flattened portions 21 and risers 21' (Fig. 3) disposed adjacent the lower ends of the stepped portions 14. When the cross-member 19 is drawn down to the position shown in dot and dash lines in the manner, and for the purpose described above, the end loops 17 seat themselves in the flattened portions 21. Thus, the flattened portions and the resilience of the arms 12 cause said gaffs 13 to remain in their effective positions until released by the fisher, which release is effected simply by manually drawing said extending arms closer together and unseating the end loops 17 from the flattened portions 21.

A modification of the present invention is illustrated in Figs. 4 and 5, and differs from the first described embodiment in that formed at the lower ends of the inwardly extending stepped portions 14, in place of the flattened portions 21, the further stepped portions are constituted by inwardly extending short stepped portions 22 provided with risers 22'. In operation, when the cross member 19 is drawn toward the gaffs 13 by a fish caught on the bait-hook 10 and said gaffs are thereby drawn together to be effective, the end loops 17 on said cross member are seated in the short stepped portions 22 and the gaffs 13 are locked effectively. Here, also, the gaffs are unlocked by the fisher simply by squeezing the arms 12 closer together and unseating the end loops 17.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A fish hook comprising a length of resilient wire bent into an inverted V-shape to have depending side arms, said length of wire having a loop at the junction of the side arms for attachment to the end of a fish line, said side arms being biased apart and having inwardly directed gaffs at their free ends, a cross-member in the form of a length of wire extended between said side arms, said cross-member having a loop intermediate of its ends facing away from said first-mentioned loop, a bait hook depended from said second loop and between said side arms, said cross-member being of a length corresponding to the spacing between said side arms closely adjacent said first loop and having its ends curled slidably about said side arms to draw said side arms together moving said gaffs inward as said cross-member is slid along said side arms away from said first loop, and inwardly extending, angular, laterally aligned stepped portions formed in said side arms for limiting both upward and downward movement of the cross-member and further inwardly extending, angular, laterally aligned stepped portions formed in said side arms adjacent the downward movement limiting stepped portions into which the cross-member locks for holding the side arms drawn together.

2. A fish hook comprising a length of resilient wire bent into an inverted V-shape to have depending side arms, said length of wire having a loop at the junction of the side arms for attachment to the end of a fish line, said side arms being biased apart and having inwardly directed gaffs at their free ends, a cross-member in the form of a length of wire extended between said side arms, said cross-member having a loop intermediate of its ends facing away from said first-mentioned loop, a bait hook depended from said second loop and between said side arms, said cross-member being of a length corresponding to the spacing between said side arms closely adjacent said first loop and having its ends curled slidably about said side arms to draw said side arms together moving said gaffs inward as said cross-member is slid along said side arms away from said first loop, and inwardly extending, angular, laterally aligned stepped portions formed in said side arms for limiting both upward and downward movement of the cross-member and further inwardly extending, angular, laterally aligned stepped portions formed in said side arms adjacent the downward movement limiting stepped portions into which the cross-member locks for holding the side arms drawn together for retaining said cross-member in a position along the length of said side arms in which said side arms are drawn together.

3. A fish hook comprising a length of resilient wire bent into an inverted V-shape to have depending side arms, said length of wire having a loop at the junction of the side arms for attachment to the end of a fish line, said side arms being biased apart and having inwardly directed gaffs at their free ends, a cross-member in the form of a length of wire extended between said side arms, said cross-member having a loop intermediate of its ends facing away from said first-mentioned loop, a bait hook depended from said second loop and between said side arms, said cross-member being of a length corresponding to the spacing between said side arms closely adjacent said first loop and having its ends curled slidably about said side arms to draw said side arms together moving said gaffs inward as said cross-member is slid along said side arms away from said first loop, said side arms having intermediate of their ends laterally aligned stepped portions for limiting both upward and downward movement of the cross-member, and further stepped portions formed in said side arms adjacent the downward movement limiting stepped portions into which the cross-member locks portions for holding said side arms drawn together.

4. A fish hook in accordance with claim 1 in which part of the last named stepped portions are flattened to lock said cross member more effectively.

BENEDICT SHAW.

REFERENCES CITED

The following references are of record in the file of this patent:

UNITED STATES PATENTS

| Number | Name | Date |
|---|---|---|
| 94,895 | Kemlo | Sept. 14, 1869 |
| 129,053 | Pitcher | July 16, 1872 |
| 687,381 | McCollough | Nov. 26, 1901 |
| 811,555 | Freel | Feb. 6, 1906 |
| 1,340,780 | Leon | May 18, 1920 |
| 2,414,907 | Smith | Jan. 28, 1947 |